United States Patent [19]
McHugh

[11] Patent Number: 5,923,141
[45] Date of Patent: Jul. 13, 1999

[54] CURRENT SHAPING IN RELUCTANCE MACHINES

[75] Inventor: Paul M. McHugh, Leeds, United Kingdom

[73] Assignee: Switched Reluctance Drives, Ltd., North Yorkshire, United Kingdom

[21] Appl. No.: 08/833,709

[22] Filed: Apr. 9, 1997

[30] Foreign Application Priority Data

Apr. 12, 1996 [GB] United Kingdom .................... 9607688

[51] Int. Cl.⁶ ................................. H02P 6/02; H02P 7/36
[52] U.S. Cl. .......................... 318/701; 318/685; 318/254
[58] Field of Search ................................... 318/254, 701, 318/439, 138, 696, 587

[56] References Cited

U.S. PATENT DOCUMENTS

| Re. 34,609 | 5/1994 | Mueller .................................... 318/254 |
| 747,698 | 12/1903 | Geisenhoner . |
| 4,213,070 | 7/1980 | Lund et al. ............................... 310/71 |
| 4,249,116 | 2/1981 | Hieda ...................................... 318/254 |
| 4,253,053 | 2/1981 | Ray et al. ................................. 318/701 |
| 4,427,910 | 1/1984 | Richter et al. ........................... 310/214 |
| 4,447,771 | 5/1984 | Whited ..................................... 318/661 |
| 4,488,101 | 12/1984 | Studtmann ............................... 318/800 |

(List continued on next page.)

FOREIGN PATENT DOCUMENTS

| 0 557 811 A1 | 9/1993 | European Pat. Off. .......... H02P 6/02 |
| 0 749 202 A1 | 12/1996 | European Pat. Off. .......... H02P 7/05 |
| 4 036 565 A1 | 5/1992 | Germany .......................... H02P 8/00 |
| 3-089897 | 4/1991 | Japan ................................ H02P 8/00 |
| 2 167 253 | 5/1986 | United Kingdom .............. H02P 6/00 |
| 2 167 910 | 6/1986 | United Kingdom .............. H02K 1/06 |
| WO 93/05564 | 3/1993 | WIPO ................................ H02P 6/02 |
| WO 94/28618 | 12/1994 | WIPO ................................ H02P 6/02 |

OTHER PUBLICATIONS

F. Blaabjerg et al., "Investigation and Reduction of Acoustical Noise from Switched Reluctance Drives in Current and Voltage Control," Sep. 5–7 1994, Proc. ICEM '94, pp. 589–594.

C. Y. Wu and C. Pollock, "Analysis and Reduction of Vibration and Acoustic Noise in the Switched Reluctance Drive," 1993, Proceedings of the IAS '93, pp. 106–113.

S. Chan et al., "Performance Enhancement of Single–Phase Switched–ReluctanceMotor by DC Link Voltage Boosting," Sep. 1993, IEEE Proceedings–B, vol. 140, pp. 316–222.

Stephenson and Blake, "The Characteristics, Design and Applications of Switched Reluctance Motors and Drives," PCIM Conference & Exhibition, Jun. 21–24, 1993, Nuremberg, Germany.

D. E. Cameron et al., "The Origin and Reduction of Acoustic Noise in Double Salient Variable–ReluctanceMotors," Nov./Dec. 1992, IEEE Transactions on Industry Applications, vol. 28, No. 6, pp. 1250–1255.

Shi–Ping Hsu et al., "Modeling and Analysis of Switching DC–to–DC Converters in Constant–Frequency Current–Programmed Mode," 1979, IEEE Power Electronics Specialists Conference, pp. 284–301.

Frede Blaabjerg and John K. Pedersen, "Digital Implemented Random Modulation Strategies for AC and Switched Reluctance Drives," *Proceedings of the IECON'93*, pp. 676–682, International Conference on Industrial Electronics, Control and Instrumentation, Maui, Hawaii, Nov. 15–19, 1993.

(List continued on next page.)

*Primary Examiner*—Paul Ip
*Attorney, Agent, or Firm*—Arnold, White & Durkee

[57] ABSTRACT

A current control circuit for a switched reluctance machine provides corner shaping at the end of the active conduction period of a phase in which the phase winding is energized. The pulse width modulated firing pulses are gradually reduced in duty cycle so that the transition between the current in the winding in the active period and the decay of current in a ramp down period is smoothed to reduce the forces leading to vibration and acoustic noise.

22 Claims, 6 Drawing Sheets

U.S. PATENT DOCUMENTS

| | | | |
|---|---|---|---|
| 4,500,824 | 2/1985 | Miller | 318/701 |
| 4,520,302 | 5/1985 | Hill et al. | 318/696 |
| 4,563,619 | 1/1986 | Davis et al. | 318/138 |
| 4,661,756 | 4/1987 | Murphy et al. | 318/701 |
| 4,670,696 | 6/1987 | Byrne et al. | 318/701 |
| 4,691,038 | 9/1987 | MacMinn | 318/696 |
| 4,712,050 | 12/1987 | Nagasawa et al. | 318/254 |
| 4,731,570 | 3/1988 | Lee | 318/696 |
| 4,761,580 | 8/1988 | Hein et al. | 310/214 |
| 4,849,873 | 7/1989 | Vanderhelst | 363/55 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |
| 4,943,760 | 7/1990 | Byrne et al. | 318/701 |
| 5,043,643 | 8/1991 | Hedlund et al. | 318/254 |
| 5,072,166 | 12/1991 | Ehsani | 318/696 |
| 5,075,610 | 12/1991 | Harris | 318/701 |
| 5,119,000 | 6/1992 | Schultz | 318/254 |
| 5,124,607 | 6/1992 | Rieber et al. | 310/214 |
| 5,140,207 | 8/1992 | Baumeister | 310/83 |
| 5,144,209 | 9/1992 | Ingji et al. | 318/254 |
| 5,175,458 | 12/1992 | Lemmer et al. | 310/71 |
| 5,196,775 | 3/1993 | Harris et al. | 318/638 |
| 5,239,217 | 8/1993 | Horst | 310/51 |
| 5,239,220 | 8/1993 | Taji et al. | 310/214 |
| 5,270,603 | 12/1993 | Narumi | 310/260 |
| 5,296,785 | 3/1994 | Miller | 318/254 |
| 5,343,105 | 8/1994 | Sakabe et al. | 310/179 |
| 5,373,206 | 12/1994 | Lim | 310/68 |
| 5,446,359 | 8/1995 | Horst | 318/701 |
| 5,461,295 | 10/1995 | Horst | 318/701 |
| 5,479,080 | 12/1995 | Jones et al. | 318/701 |
| 5,487,213 | 1/1996 | Hult et al. | 29/556 |
| 5,563,488 | 10/1996 | Stephenson et al. | 318/701 |
| 5,589,752 | 12/1996 | Iwasaki et al. | 318/701 |

OTHER PUBLICATIONS

Richard S. Wallace and David G. Taylor, "A Balanced Commutator for Switched Reluctance Motors to Reduce Torque Ripple," *IEEE Transactions on Power Electronics,* vol. 7, No. 4, pp. 617–626, Oct. 1992.

Richard S. Wallace and David G. Taylor, "Low–Torque–Ripple Switched Reluctance Motors for Direct–Drive Robotics," *IEEE Transactions on Robotics and Automation,* vol. 7, No. 6, pp. 733–742, Dec. 1991.

Richard S. Wallace, Jr., "Design and Control of Switched Reluctance Motors to Reduce Torque Ripple," Georgia Institute of Technology, Nov. 1990.

Charles Pollock and Barry W. Williams, "A Unipolar Converter for a Switched Reluctance Motor," *Conference Record of the 1988 IEEE Industry Applications Society Annual Meeting,* pp. 44–49, Pittsburg, Pennsylvania, Oct. 2–7, 1988.

C. Pollock and C. Y. Wu, "Acoustic Noise Cancellation Techniques for Switched Reluctance Drives," *Record of the Industry Applications Conference (IAS),* vol. 1, pp. 448–455, Orlando, Florida, Oct. 8–12, 1995.

Abstract of Japanese patent application No. 06–086769 published as 07–298669 Nov. 10, 1995.

C. Y. Wu and C. Pollock, "Analysis and Reduction of Vibration and Acoustic Noise in the Switched Reluctance Drive," *IEEE Transactions on Industry Applications,* vol. 31, No. 1 pp. 91–98, Jan./Feb. 1995.

CURRENT SHAPING IN RELUCTANCE MACHINES

FIELD OF THE INVENTION

This invention relates to current shaping in reluctance machines. In particular, the present invention relates to a current control circuit for reducing vibrations in a switched reluctance machine.

BACKGROUND OF THE INVENTION

In general, a reluctance machine is an electric machine in which torque is produced by the tendency of its movable part to move into a position where the inductance of an excited winding is maximized. The general theory, design and operation of switched reluctance machines is well known and is discussed, for example, in the paper "The Characteristics, Design and Applications of Switched Reluctance Motors and Drives" by Stephenson and Blake and presented at the PCIM '93 Conference and Exhibition at Nürnberg, Germany, Jun. 21–24, 1993.

FIG. 1 illustrates a typical switched reluctance machine having a stator 10 including six projecting stator poles 11–16 that define a principal stator axis (extending outwardly from FIG. 1). A rotor 18 is coupled to a rotatable shaft co-axial with the principal axis of the stator. In FIG. 1, the rotor is positioned within the bore formed by the stator and the inwardly pointing stator poles 11–16 and is mounted on a shaft (not shown) that is mounted on bearings and is free to rotate. The rotor 18 has a number of outwardly extending projections 19 which form the rotor poles.

Associated with each stator pole is a wound coil of wire. In the illustrated machine, the two coils of opposing stator poles are coupled together to form three phases: phase A (coils from poles 11 and 14); phase B (coils from poles 12 and 15); and phase C (coils from poles 13 and 16). In the example illustrated in FIG. 1, when phase A is energised, current will flow through its coils such that stator pole 11 becomes, for example, an inward-pointing electromagnet of positive polarity and stator pole 14 becomes an inward-pointing electromagnet of negative polarity. These electromagnets will produce a force of attraction between the energised stator poles and the rotor poles which will produce a torque. By switching energisation from one phase to another, the desired torque may be maintained regardless of the angular position of the rotor. By switching the energisation of the phase windings to develop positive torque, the machine may be operated as a motor; by energisation of the phase windings to develop a retarding torque the machine may be operated as a brake or generator.

For the sake of illustration, a simple form of machine having six stator poles and two rotor poles (i.e. a 6/2 machine) is shown. Those skilled in the art will recognize that other combinations are well-known. The present invention applies equally to such machines. Moreover, the present invention is applicable to inverted machines, where the stator is positioned within the bore of an outer rotating rotor, and to linear machines, in which the movable member moves linearly with respect to the stator. In the art the movable member of a linear motor is also commonly referred to as a rotor.

When a switched reluctance machine is running, the torque (and other machine performance parameters) may be adjusted by monitoring the rotor's position, energising one or more phase windings when the rotor is at a first angular position, referred to as the "turn-on angle", and then de-energising the energised windings when the rotor rotates to a second angular position, referred to as the "turn-off angle". The angular distance between the turn-on angle and the turn-off angle is known as the "conduction angle", constituting the limits of an active period in which the phase winding is energised.

At standstill and at low speeds, the torque of a switched reluctance machine can be controlled by varying the current in the energised phases over the period defined by the turn-on and turn-off angles. Such current control can be achieved by chopping the current using a current reference with phase current feedback. Such current control is referred to as "chopping mode" current control. Alternatively, pulse width modulation (PWM) voltage control may be used. Chopping mode current control and PWM control strategies are generally understood and chopping mode current control is generally described below.

FIG. 2A illustrates an exemplary current in a phase winding when chopping mode current control is used when the switched reluctance machine is operating as a motor. As is illustrated in FIG. 2A, the phase is initially energised at a point corresponding to the turn-on angle and current begins to increase until it reaches the current reference. At that point, the current is chopped by a controller, de-energising the phase winding. The current drops until the phase winding is again re-energised and the process repeats. As indicated in FIG. 2A, in the chopping mode, the overall shape of the current waveform defines a substantially rectangular region where the beginning and end points of the rectangular region generally correspond to the turn-on and turn-off angles, defining between them the conduction angle.

As the angular speed of the motor increases, a point is reached where there is insufficient time for more than a single pulse of current to occur during each phase period. Accordingly, at these speeds pulse width modulation or chopping strategies are ineffective. The torque of the motor is then commonly controlled by controlling the position and duration of the voltage pulse applied to the winding during the phase period. Because the single pulse of voltage is applied during each phase period, this form of control is referred to as "single-pulse control". This is illustrated in FIG. 2B.

FIG. 3 generally illustrates power circuitry that may be used to control the energisation of a phase winding for both chopping mode and single-pulse mode current control. A phase winding 30 is coupled to a source of DC power provided through a DC bus, comprising positive and negative rails 31/32, by upper switching device 33 and lower switching device 34. Return diodes 35 and 36 provide a current path from the DC bus through the phase winding 30 when switching devices 33 and 34 are opened. As those skilled in the art will appreciate, phase winding 30 is generally energised by closing switches 33 and 34, thus coupling the phase winding to the DC bus.

The circuit illustrated in FIG. 3 may be used to implement chopping mode current control as follows: when the rotor reaches an angular position that corresponds to the turn-on angle, switches 33 and 34 are closed. The phase winding 30 is then coupled to the DC bus, causing an increasing magnetic flux to be established in the motor. It is the magnetic field associated with this flux which acts on the rotor poles to produce the motor torque. As the magnetic flux in the machine increases, current flows from the DC supply as provided by the DC bus, through the switches 33 and 34 and through the phase winding 30.

The current flowing through the phase winding 30 is sensed by a current sensor or other device (not shown) that provides a signal corresponding to the magnitude of the phase current. The signal corresponding to the phase current is then compared with a signal representing a reference current. When the actual current in the phase winding exceeds the reference current, the phase winding is de-energised by opening one or both of switches 33 and 34. When both switches 33 and 34 are opened, the current in the phase winding 30 transfers from switches 33 and 34 and flows through the diodes 35 and 36. The diodes 35 and 36 then apply the DC voltage appearing on the DC bus in the opposite sense, causing the magnetic flux in the machine (and therefore the phase current) to decrease. When the current decreases below the reference current by a predetermined value, the phase is re-energised and the current again begins to increase.

The process of energising the phase winding 30, de-energising it when the phase current exceeds the reference current, and re-energising it when the phase current drops below the reference current by a predetermined value, repeats itself during the interval defined by the turn-on and turn-off angles. Typically, when the rotor reaches an angular position corresponding to the turn-off angle, switches 33 and 34 are opened, and the phase current is allowed to drop to zero. At that point the diodes 35 and 36 turn off, disconnecting the phase winding from the power supply.

As those skilled in the art will appreciate, the above discussion of current control is but one example of a current control strategy that may be used and that alternative strategies, e.g., strategies including freewheeling, may also be used. The circuit illustrated in FIG. 3 may be also used to implement single-pulse mode current control.

The inherently inductive nature of a phase winding can lead to problems with transient voltage in the forms of spikes when switching a voltage across the winding. These spikes have a much larger peak magnitude than the switched voltage and a very high rate of increase and decrease. The magnitude of the voltage can damage the switch element. To counter this it is known to use a so-called 'snubber' circuit connected across the switch to suppress the transient voltage spikes in the switch. In known snubber circuits the rate of increase and decrease in the voltage transient is typically suppressed without effecting appreciably the responsiveness of the switch to apply the new voltage level to the phase winding at the desired time.

As the above discussion indicates, as a switched reluctance motor (or generator) operates, magnetic flux is continuously increasing and decreasing in different parts of the machine. This changing flux will occur in both chopping mode and single-pulse current control. The changing flux results in fluctuating magnetic forces being applied to the ferromagnetic parts of the machine. These forces can produce unwanted vibration and noise. One major mechanism by which these forces can create noise is the ovalising of the stator caused by forces across the airgap. Generally, as the magnetic flux increases along a given diameter of the stator, the stator is pulled into an oval shape by the magnetic forces. As the magnetic flux decreases, the stator springs back to its undistorted shape. This ovalising and springing back of the stator can cause unwanted vibration and audible noise.

In addition to the distortions of the stator by the ovalising magnetic forces, unwanted vibration and acoustic noise may also be produced by abrupt changes in the magnetic forces in the motor. The abrupt application or removal of magnetic force can cause the stator to vibrate at one or more of its natural resonance frequencies. In general, the lowest (or fundamental) natural frequency dominates the vibration, although higher harmonics can be emphasized by repeated excitation at the appropriate frequency.

In addition to the stator distortions resulting from the ovalising and vibration phenomena described above, the fluctuating magnetic forces in the motor can distort the stator in other ways, as well as distorting the rotor and other ferromagnetic parts of the machine. These additional distortions are another potential source of unwanted vibration and noise.

Although the problem of unwanted acoustic noise and vibration has been recognized, known control systems for reluctance motors do not adequately solve the problem. For example, the general problem of acoustic noise in switched reluctance motor systems is discussed by C. Y. Wu and C. Pollock in "Analysis and Reduction of Vibration and Acoustic Noise in the Switched Reluctance Drive", Proceedings of the Industry Applications Society, IAS '93 Conference, Toronto, Oct. 2–8 1993, pp. 106–113.

In general, the method suggested by Wu and Pollock involves control of the current in the phase winding such that the current is controlled in two successive switching steps with the second switching step occurring approximately one-half of a resonance cycle after the first where the resonance cycle is defined by the natural frequency of the machine. This approach is typically implemented by switching off one of the power devices at a first point in time to cause a first stepped reduction in applied voltage, and then later switching off the second power device. Between the time when the first switching device is switched off and the second switching device is switched off, the current is allowed to freewheel through a freewheeling diode and the second switching device.

The two-step voltage-reduction approach to noise reduction in switched reluctance motors discussed above suffers from several limitations and disadvantages. The two-step voltage-reduction approach limits the flexibility to dynamically adjust the freewheeling period for each phase cycle. As discussed above, in the two-step voltage-reduction approach, the duration of the freewheeling period is selected to reduce the noise produced by the system. There are many instances when it would be desirable to optimize the freewheeling duration according to other criteria.

An additional limitation of the two-step voltage-reduction approach, and other approaches that utilize freewheeling to reduce noise, is that, since there is typically only one freewheeling period per phase energisation cycle, freewheeling generally reduces noise produced by only a single frequency of the motor system. Freewheeling to reduce noise at one frequency does not necessarily reduce noise produced by other frequencies in motor systems that have more than one resonance frequency. Accordingly, such approaches do not reduce many of the frequencies at which unwanted noise is produced. A further disadvantage with the freewheeling approach is that there are several motor switching circuits that simply do not allow freewheeling. These systems cannot use freewheeling to reduce noise.

U.S. Pat. No. 5,461,295 (Horst) discloses apparatus for controlling the current profile in a switched reluctance motor. The phase winding current is initially at a first level in a first part of the active period of the switch cycle. Thereafter, it is linearly reduced over a second part of the active period. When the current is to decay due to switching off the switches at the end of the active period, the transition between the linearly reducing current in the second part of the active period and the ramp of the decay of the current is less abrupt, producing a smoother transition.

SUMMARY OF THE INVENTION

The present invention overcomes many of the limitations and disadvantages associated with known systems and provides a circuit for energising the winding phases of a switched reluctance machine in a particular manner to reduce unwanted noise and vibrations produced by the machine.

According to one form the invention provides a current control circuit for a switched reluctance machine system having a phase conduction cycle for the or each phase winding of the machine, which cycle comprises an active period in which an energising voltage is applied across the phase winding to maintain a phase current, a subsequent corner period, a subsequent ramp period in which the current is reduced to zero in a substantially linear manner, and a subsequent inactive period in which the phase winding is not energised, the circuit including control means operable to produce a current level signal for controlling the current in the phase winding according to the cycle, and operable to determine the end of the active period and to control the current in the corner period such that the current in the winding is reduced according to a predetermined curve before the ramp period.

The invention provides a so-called corner window in which the current in a phase winding is controlled to effect a smooth transition between the active period and the current decay in the inactive period. The level of current in the active period, the rate of decay in the inactive period, as well as the speed of and load on the machine can all contribute to the determination of a suitable current curve in the corner window.

BRIEF DESCRIPTION OF THE DRAWINGS

The present invention can be put into practice in various ways, some of which will now be described by way of example with reference to the accompanying drawings in which.

DETAILED DESCRIPTION OF THE INVENTION

The features of the present invention may be fully understood with reference to the following detailed description. In all cases, it should be understood that this discussion is made with reference to exemplary embodiments. These embodiments are not intended to limit the scope of the invention as defined by the claims. Variations and modifications of the specific embodiments described herein will be apparent to those skilled in the art.

Figure 1:
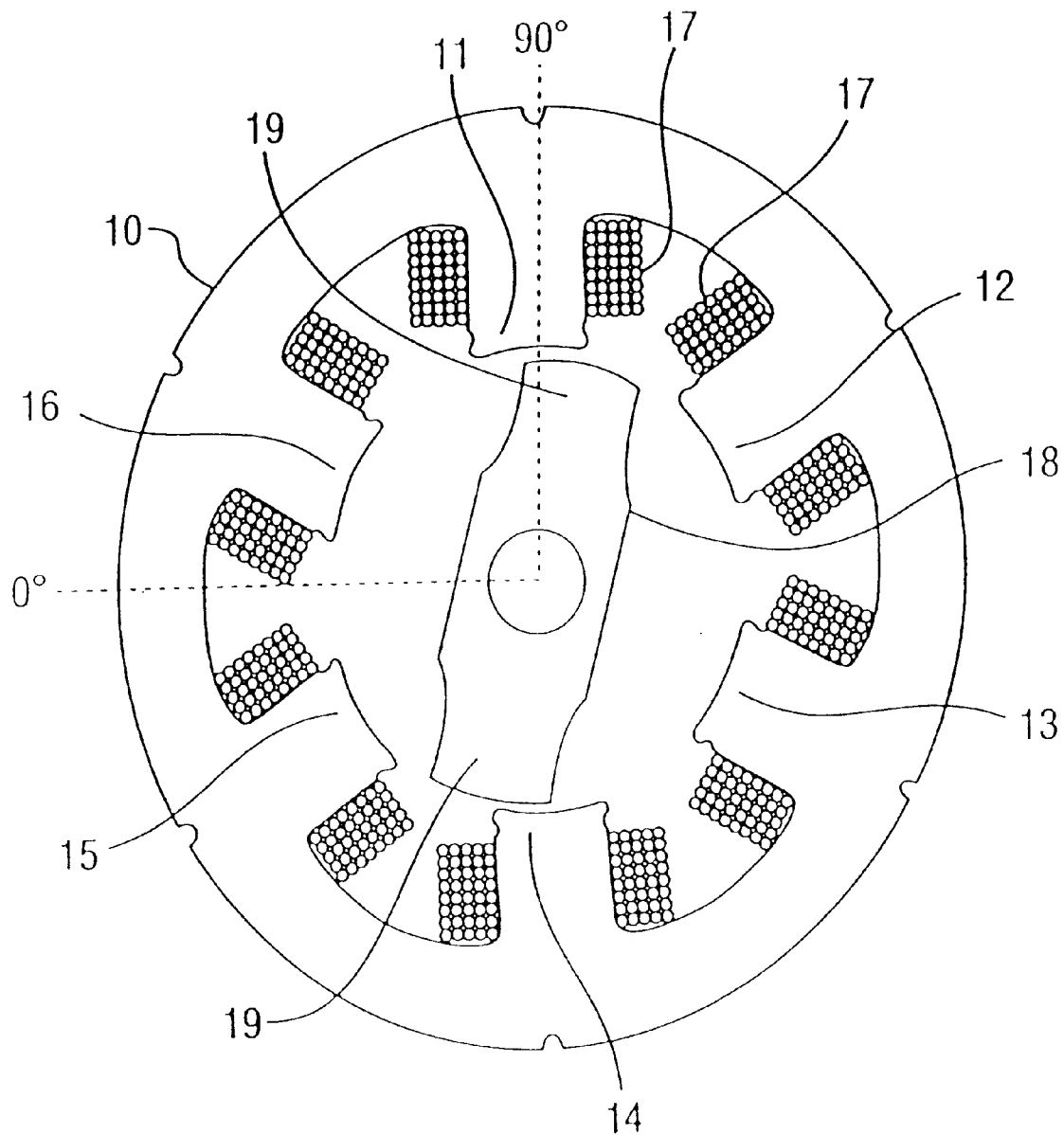
FIG. 1 illustrates a prior art reluctance machine.
Figure 2A:
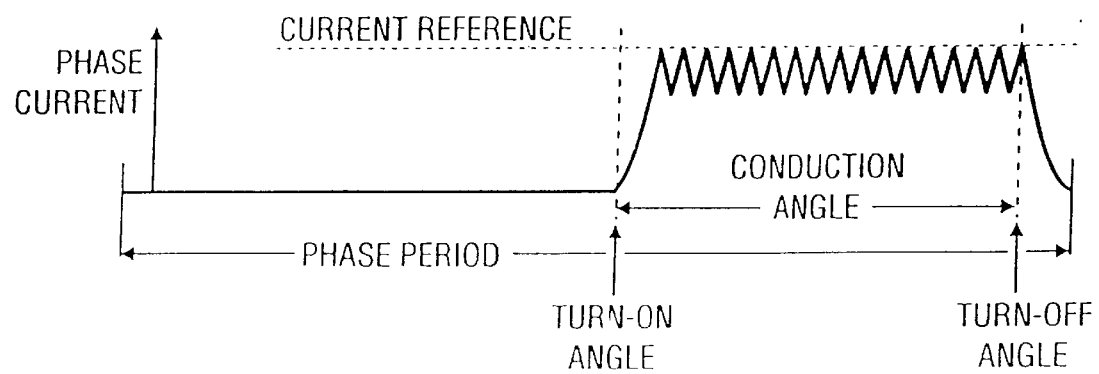
FIGS. 2A and 2B illustrate chopping mode control and single pulse control of a switched reluctance machine, respectively.

In the chopping mode of a switched reluctance motor, the current is typically regulated to a desired level in an active period of the overall cycle of operation, as previously shown in FIG. 2A. In the remaining part of the phase period, the switches are non-conducting. Each phase is controlled in sequence in the same way in accordance with the input demand and the load on the motor. When the switches are non-conducting, any current in the phase winding decays over a finite period. The invention provides a new way of addressing the transition from the active period in which the switches are conducting, to the period when the switches are non-conducting. The circuit of the invention shapes the current near the end of the active period in a so-called 'corner window' and further controls the decay of the current in a 'ramp' period as the current is taken towards zero. As part of the transition, it is necessary to determine the magnitude of the current near the end of the active period and the rate of decay of the current in the ramp period in order for it to be smooth. The effective magnitude of the current and the slope of the ramp are merged smoothly by the invention to avoid an abrupt transition between them that would otherwise provide a source of potential vibration and acoustic noise.

There are many known methods of current regulation which can be used to control the current during the active period. These methods include hysteresis control (where the current is allowed to fall from an upper bound to a lower bound) and pulse width modulated (PWM) control (where the duty cycle of the PWM signal is a measure of the required current). This invention is not dependent upon any particular type of current regulation. For convenience, the description below is based on a PWM controller. Thus, the active period of a conduction cycle for a given phase corresponds to a PWM signal having a duty cycle consistent with the current level to be maintained.

Figure 4:
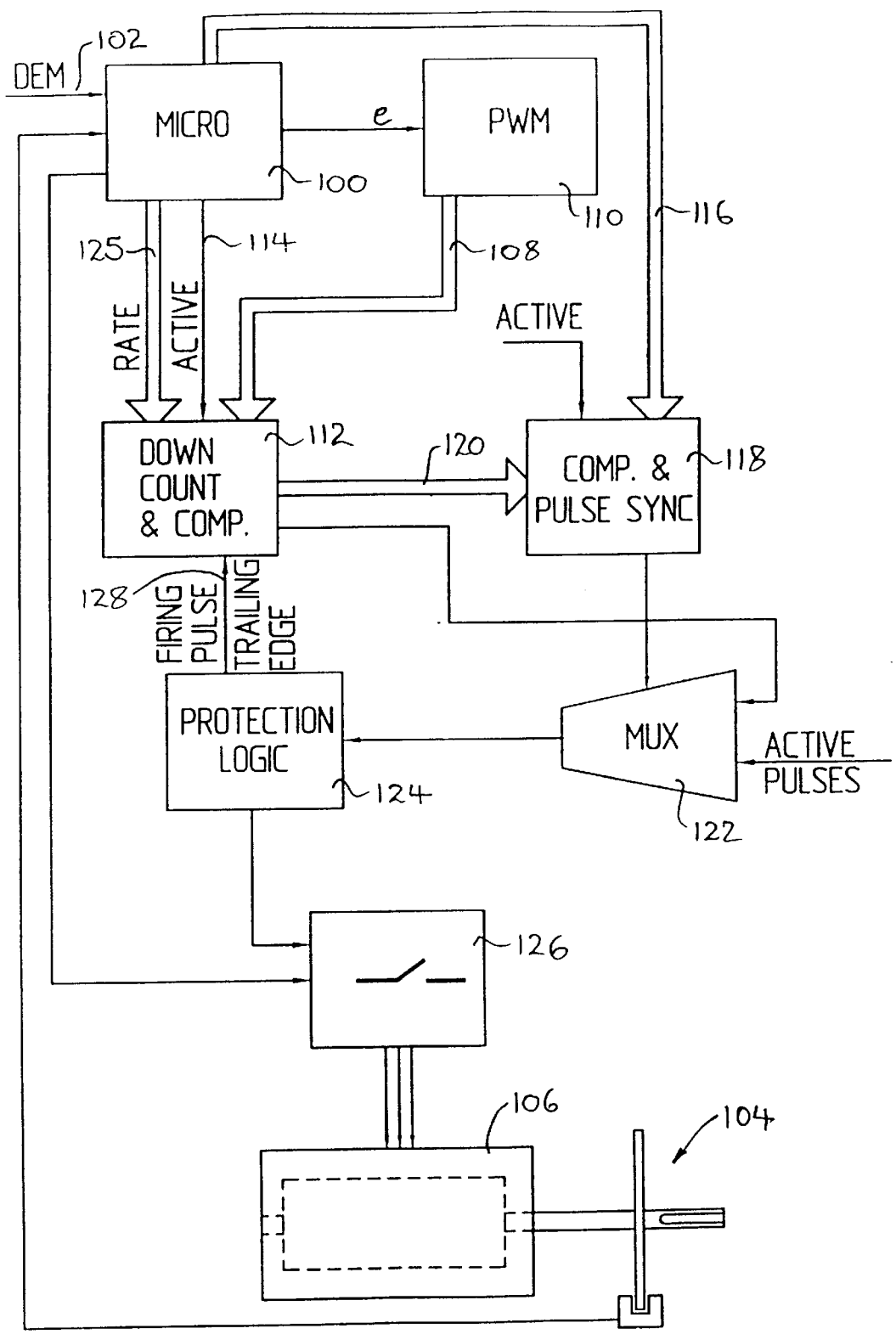
FIG. 4 is a schematic diagram of an embodiment of the invention.

Referring to FIG. 4, a drive system for a switched reluctance motor comprises a microprocessor-based controller 100 that receives an input demand signal on line 102 that is related to a desired speed or torque output of the motor.

Figure 5A:
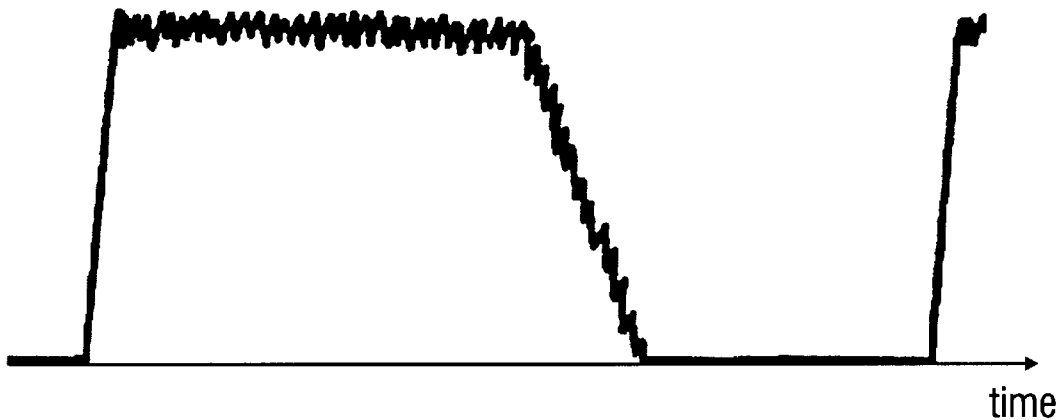
FIGS. 5a and 5b illustrate winding current waveforms.
Figure 5B:
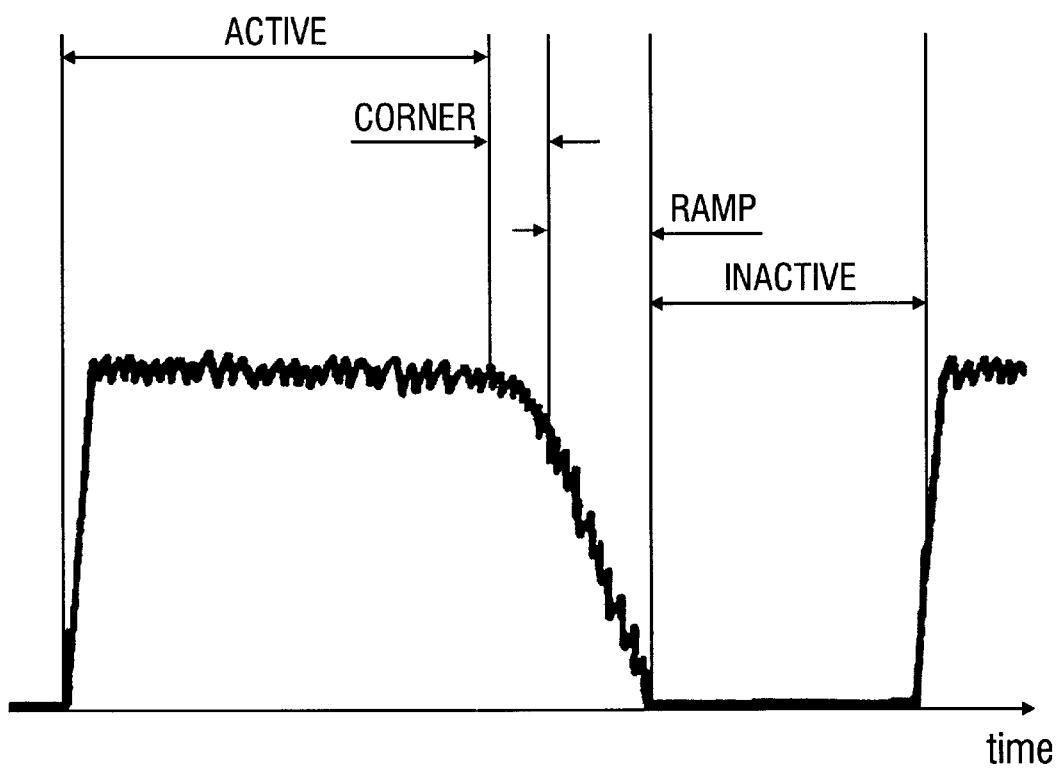

The current waveform of the phase winding, when controlled in the manner to be described, is shown in FIG. 5(b). The sections of the waveform denoted by "active", "corner", "ramp" and "inactive" are discussed below. A rotor position signal is fed back from a rotor position transducer 104 that is mounted to rotate with a switched reluctance motor 106 to be controlled. According to the error e, being the difference between the demand input and the actual output from the motor for a given load as derived from the output of the rotor position transducer 104, a pulse-width modulated signal on a bus 108, from a pulse width modulator 110, is adjusted in its duty cycle for the timed phase energisation of the stator windings of the motor 106.

The output of the pulse width modulator 110 is supplied as a digital word on the bus 108, having a magnitude corresponding to the duty cycle, to a down counter and comparator 112. In periods when the pulse width modulation is active for a given phase to control the current level during phase energisation, an active signal is transmitted on line 114 from the controller 100 to the counter and comparator 112 to disable its operation, so that the output of the counter and comparator is an unmodified form of the pulse width modulated output signal in the active period of a cycle. The controller 100 also generates an output that is a signal indicative of the end of the corner window on a bus 116, i.e. the moment when the corner shaping ends and the ramp down of current is begun. This is a digital word supplied to a comparator and synchronisation circuit 118. The digital word has a magnitude that is compared with the magnitude of the pulse width word on bus 120 from the down counter 112 in the corner window. Thus, parity between the two digital words on buses 116 and 120 will cause an output from the comparator 118 indicative of the end of the corner window period.

The active signal from the controller 100 is also received by the comparator 118 to disable it in the active period in which energisation of the phase windings is taking place. The comparator thus defines the corner window in which the transition between the active period and the ramp period is to be smoothly effected. The other parameter of current shaping for a smooth transition between the active and inactive periods is the count rate of the counter 112.

A multiplexer 122 is toggled from transmitting active pulses in accordance with control in the active period to current shaping pulse width modulation in the corner window by the output of the comparator 118. The firing signals from both the active and corner window periods are supplied to protection logic 124 which relays the output of the multiplexer 122 as a firing signal for a conventional switching circuit 126 for the machine. The protection logic includes a comparator which compares a signal representative of winding current with a threshold level. If the threshold is exceeded, an excess current situation exists and the switching of the motor is shut down to prevent damage to the system. The protection logic also produces a firing pulse trailing edge signal on line 128 which is used to synchronise the output of the down counter such that the variable pulse width modulation signal in the corner window runs on smoothly from the pulse width modulation in the active period.

The controller and the associated control hardware described above is implemented in this embodiment as an application specific integrated circuit (ASIC) as will be well known to the skilled person. Other forms of implementation will be apparent to the skilled person.

FIG. 5(a) shows the typical prior art abrupt transition in current between the active period, in which the chopped current is regulated to a desired level in the phase winding, and the ramp period. FIG. 5(b) shows the smooth transition effected according to the invention in which a rounded current transition is made between the active period and the generally linear ramp of the decaying current. The rounded current shaping is effected by the down counter decrementing the duty cycle of the pulse width modulation in the corner window at a rate and over a period calculated or retrieved by the controller.

Referring again to FIG. 4, the down counter 112 takes in the pulse width modulation signal as the eight-bit word on bus 108 and latches the value on every falling edge of the output firing pulses whilst in the active period. This is to ensure that at the end of the active period the latest pulse width modulation signal value is loaded into the counter, ready to start being decremented to produce progressively shorter pulses and so reduce the motor current to form the rounded corner. The count rate is effected by setting the required frequency in the controller and transmitting it as a countdown rate signal on bus 125 to the down counter 112.

The comparator 118 compares the decremented pulse width with the end pulse width which is also sent as a calculated value from the microprocessor on bus 116. This produces the corner window period in which the countdown rate is decremented. The window starts at the end of the active period and stops when the decremented pulse width is equal to the end pulse width.

During the corner window, the firing pulses continue but are made progressively shorter according to the shortening duty cycle of the pulse width modulated signal, thus lowering the current in the winding. This is done in such a way as to create a smooth transition of current from the approximately flat-topped waveform in the active period to the linear decay in the ramp period. Because the height of the flat topped current and the optimal gradient of the ramp will be likely to vary throughout the speed and torque ranges of a given motor, the controller should have sufficient control over both the period of the window and the rate at which the pulse width is decremented within the window. The corner window is started at a falling edge of a firing pulse in the active period, timed by the firing pulse trailing edge on line 128. It finishes when the decremented pulses reach a predetermined end value, set in this case as an eight-bit word from the controller on the bus 116. The frequency at which the firing pulse width is decremented is also set by the controller as an eight-bit word and sent to the counter 110 on bus 125. With these two variables it is possible to control the corner shape adequately over the entire speed/torque range.

The values of the length of the corner window and the rate at which the down count is made can be determined empirically. That is to say that at each of a set of motor load points the current wave shape is observed on an oscilloscope using, say, a Hall-effect current probe on the winding and the acoustic noise is either measured in an anechoic chamber or appraised qualitatively by ear. It is then possible to compile a look-up table in the controller to hold these values. In, for example, a washing machine drive, the design may only require noise reduction at a few set speeds for different loads. Therefore, the amount of variable data can be limited to the set speeds at the load settings and then fixed in the ASIC. Typically, for each setting the count rate and the end count is adjusted until subjectively good noise reduction is achieved. Alternatively, it is possible to calculate the values at each load point in real time from a set of linear equations derived from the set of measured values derived empirically. In other systems it may be that linear approximation is not sufficiently accurate. In this case, a best-fit polynomial could be used, provided the controller is fast enough to compute the required values in the time available.

Figure 6:
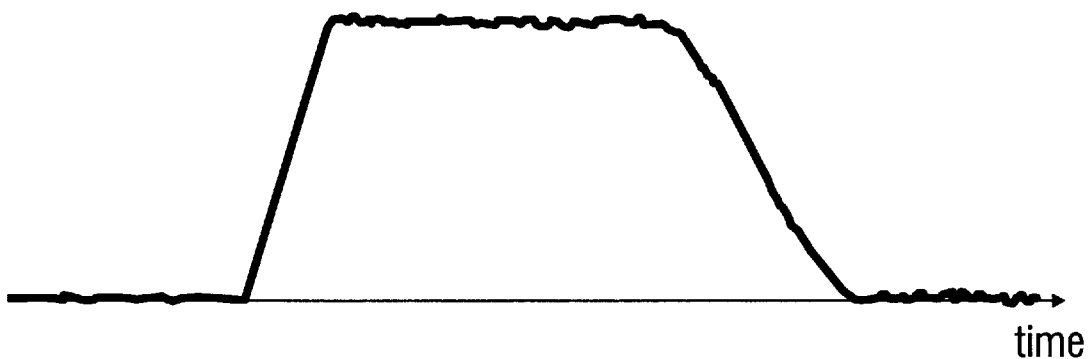
FIG. 6 illustrates a winding current waveform according to the invention.

It is also possible, using the circuit of FIG. 4, to modify the front end of the current waveform. This can be done either in addition to or as a replacement for the corner window shaping described above. The rising edge of the waveform can be 'softened' by adjusting the duty cycle of the PWM signal to give a waveform as shown in FIG. 6. This can also have benefits for the acoustic performance of the drive system.

The invention has been described in relation to pulse width modulation for chopping control of the phase windings. Other digital modulation schemes could be used relying on a digital modulation information, e.g. pulse amplitude modulation. Furthermore, an analogue implementation of the invention could derive equal benefit from the use of a corner window between the active and inactive periods of a phase conduction cycle, similarly computing a best fit curve to smooth the transition between the periods.

Figure 2B:
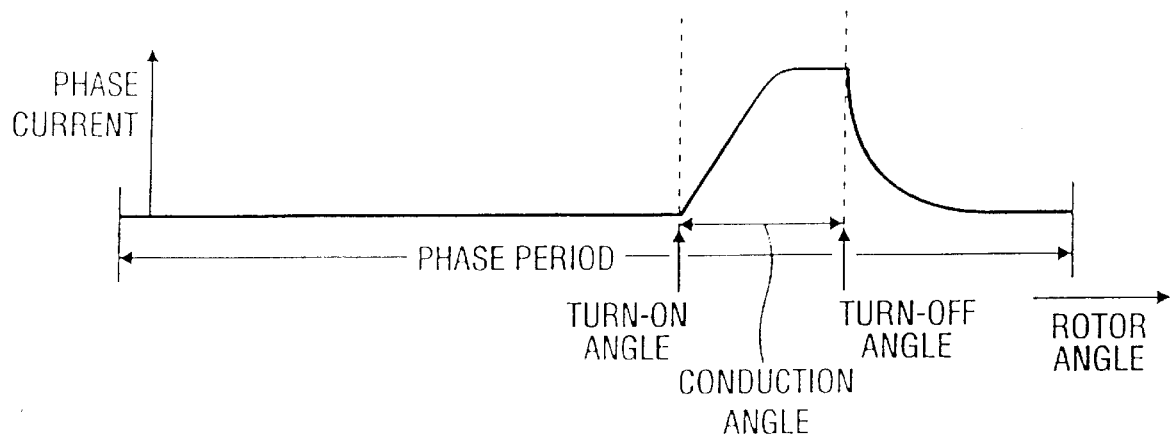
Figure 3:
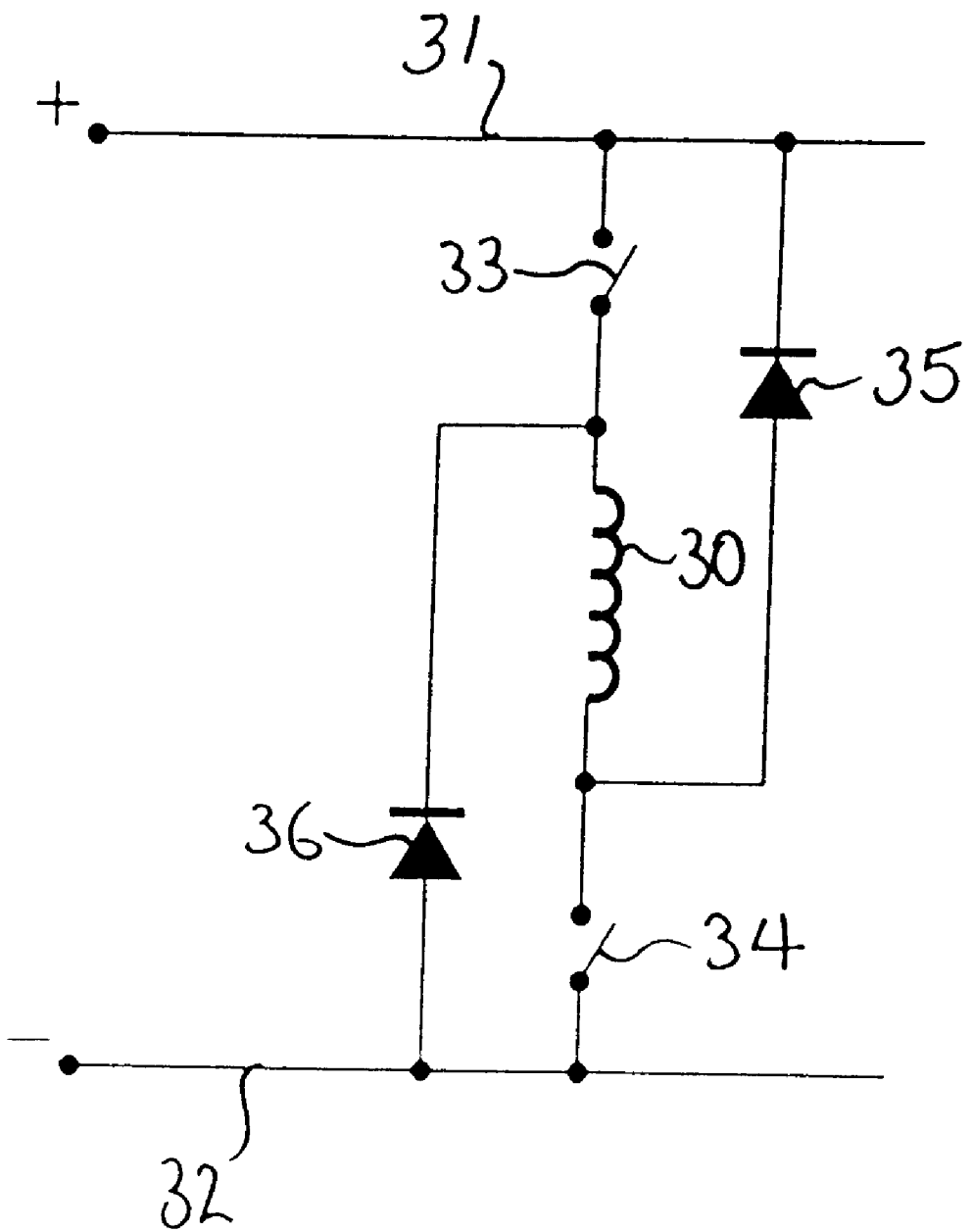
FIG. 3 illustrates a switching circuit for controlling the energisation of a phase winding of a switched reluctance machine.

While the invention has been described in conjunction with the chopping mode waveform exemplified by the prior art of FIG. 2A, it will be clear from the above description that the technique can be applied equally well to the single pulse waveform of FIG. 2B to round the transition at the turn off angle.

Thus, while the invention has been described in connection with the illustrative embodiments discussed above, those skilled in the art will recognise that many variations may be made without departing from the present invention.

Accordingly, the above description is made by way of example and not for the purposes of limitation.

The present invention is intended to be limited only by the spirit and scope of the following claims.

I claim as my invention:

1. A current control circuit for a switched reluctance machine system having a phase conduction cycle for the or each phase winding of the machine, which cycle comprises an active period in which an energising voltage is applied across the phase winding to maintain a phase current, a subsequent corner period, a subsequent ramp period in which the current is reduced to zero in a substantially linear manner, and a subsequent inactive period in which the phase winding is not energised, the circuit including control means operable to produce a current level signal for controlling the current in the phase winding according to the cycle, and operable to determine the end of the active period and to control the current in the corner period such that the current in the winding is reduced according to a predetermined curve before the ramp period.

2. A circuit as claimed in claim 1, including a modulator responsive to the current level signal from the control means to produce a modulated output signal for controlling the current in the or each phase winding.

3. A circuit as claimed in claim 2, including current shaping means for varying the modulation of the output signal.

4. A circuit as claimed in claim 3, in which the control means are operable to enable the current shaping means to vary the modulation of the output signal in the corner period.

5. A circuit as claimed in claim 2 in which the modulator is a pulse width modulator operable to produce a pulse width modulated output signal.

6. A circuit as claimed in claim 3 in which the control means are operable to control the current shaping means to vary the modulation of the output signal to provide a relatively smooth transition in the corner period between the current in the active period and the current in the ramp period.

7. A circuit as claimed in claim 1 in which the control means comprise a look-up table storing a current curve profile for the current shaping means in response to inputs, including at least one of the speed of and load on the machine.

8. A circuit as claimed in claim 1 in which the control means include processor means operable to compute a current curve profile for the current shaping means in response to inputs, including at least one of the speed of and load on the machine.

9. A circuit as claimed in claim 7 in which the current shaping means include a counter, the control means being arranged to supply a count rate signal to the counter to set the counter count rate, and a signal indicative of the modulated output signal in the active phase, the output of the counter corresponding to the current curve profile in a period determined by the magnitude of the modulated output signal.

10. A circuit as claimed in claim 9 in which the control means are operable to disable the counter during the active period.

11. A circuit as claimed in claim 9, including timing means responsive to trailing edges of the pulse width modulated output signal to enable the counter.

12. A circuit as claimed in claim 1, including a multiplexer operable to derive the output signal from the current shaping means and to disable the output signal from the modulator at the end of the active period.

13. A circuit as claimed in claim 1, including a comparator, the control means being operable to generate an end signal, indicative of the pulse width modulated output signal, corresponding to the end of the corner period, the comparator being arranged to receive the output of the counter and the end signal and to transmit an end curve signal to remove the energising voltage applied across the winding at the end of the curve.

14. A circuit as claimed in claim 1 in which the control means are operable to determine the start of the active period and to enable the current shaping means to vary the modulation of the output signal at the beginning of the active period such that the current in the winding is increased according to a curve determined by the control means before a peak current is reached to provide a relatively smooth transition between the rising current at the start of the active period and the peak current.

15. A method of controlling the current in a switched reluctance machine having at least one phase winding in which current flows during a phase conduction cycle, the cycle comprising an active period in which an energising voltage is applied across the phase winding to maintain a phase current, a ramp period in which the current is reduced to zero and a subsequent inactive period in which the phase winding is not energised, the method comprising:

producing a current level signal;

regulating the current in response to the current level signal in the active period;

determining the end of the active period; and reducing the current in the winding in a corner period, following the active period, according to a curve before the ramp period.

16. A method as claimed in claim 15, including deriving a pulse modulated signal for regulating the current in the active period.

17. A method as claimed in claim 15 in which the current is varied in the corner period to provide a smooth transition between the current in the active period and the current in the ramp period.

18. A method as claimed in claim 15, including deriving a current curve profile in response to at least one of the speed of and load on the machine, and reducing the current according to the curve profile.

19. A method as claimed in claim 18, including supplying a count rate signal to a counter in accordance with at least one of the speed of and load on the machine, thereby setting the count rate output of the counter, and supplying a signal indicative of the modulated current in the active period to the counter, the output of the counter corresponding to the current curve profile in a period determined by the magnitude of the current in the active period.

20. A method as claimed in claim 19 in which the counter is disabled during the active period.

21. A method as claimed in claim 19, when dependent on claim 16, including timing enablement of the counter to the trailing edges of the pulse width modulated signal.

22. A method as claimed in claim 19, including generating an end signal indicative of the pulse width modulated output signal, corresponding to the end of the curve; comparing the output of the counter with the end signal; and transmitting an end curve signal at the end of the curve.

* * * * *